United States Patent [19]

Prieels et al.

[11] Patent Number: 5,047,250
[45] Date of Patent: Sep. 10, 1991

[54] PROCESS FOR THE PREPARATION OF NEW YEASTS AS FOOD COMPOUNDS FOR FRY

[75] Inventors: Jean-Paul Prieels, Brussels; Lea Tirtiaux, Bierges, both of Belgium

[73] Assignee: Oleofina, S.A., Brussels, Belgium

[21] Appl. No.: 875,143

[22] Filed: Jun. 18, 1986

[30] Foreign Application Priority Data

Jun. 20, 1985 [LU] Luxembourg ............................ 85967

[51] Int. Cl.$^5$ ................................................ A23K 1/06
[52] U.S. Cl. .......................................... 426/2; 426/62; 426/72; 426/471; 435/134; 435/171; 435/255; 435/940
[58] Field of Search ............... 435/132, 134, 171, 255, 435/940–943; 426/1, 72, 805, 62, 392, 471, 2; 119/2, 3, 4

[56] References Cited

U.S. PATENT DOCUMENTS

| | | | |
|---|---|---|---|
| 4,405,650 | 9/1983 | Spadafora | 426/62 |
| 4,472,439 | 9/1984 | Akin et al. | 426/62 |
| 4,741,904 | 5/1988 | Smith et al. | 426/1 |

FOREIGN PATENT DOCUMENTS

| | | | |
|---|---|---|---|
| 55-68271 | 5/1980 | Japan . | |
| 0040827 | 12/1985 | Japan | 426/62 |
| 0971221 | 9/1982 | U.S.S.R. | 426/805 |
| 1562567 | 8/1975 | United Kingdom . | |

OTHER PUBLICATIONS

Biological Abstract 69: 43174.
Biological Abstract 70: 22553.
Brockerhoff et al., "Specific Distribution of Fatty Acids in Marine Lipids", *Archives of Biochemistry and Biophysics*, vol. 100, pp. 9–12 (1963).
Abstract of Deshimaru et al., "Nutritive Values of Various Oils for Yellowtail", *Bulletin of Japanese Soc. of Scientific Fisheries*, vol. 8 (8), pp. 1155–1157 (1982).

*Primary Examiner*—Esther L. Kepplinger
*Assistant Examiner*—Carol A. Spiegel
*Attorney, Agent, or Firm*—Roger W. Parkhurst; John K. Abokhair; M. Norwood Cheairs

[57] ABSTRACT

A method of feeding fry, shellfish or mollusks comprising directly feeding the fry, shellfish or mullusks a dried yeast feed of enhanced nutritive value comprising active yeast and up to, but not exceeding, 20% by dry weight of fish oil.

7 Claims, No Drawings

PROCESS FOR THE PREPARATION OF NEW YEASTS AS FOOD COMPOUNDS FOR FRY

FIELD OF THE INVENTION

The present invention relates to the preparation of new yeasts used as food compounds for fry, mollusks or shellfish. The term "fry", as used herein, means recently hatched fishes or small adult fishes. The present invention, in particular, relates to a process for the preparation of new yeasts, intended to replace the "marine chlorella" type of algae which are used for feeding fry.

BACKGROUND OF THE INVENTION

It is well known that farming shellfish, mollusks and fry requires the use of marine chlorella type algae of high nutritive value. These algae have a high polyunsaturated fatty acid content. The fatty acids are essential acids, since these acids are not synthesized by the animals themselves. Accordingly, these fatty acids have to be provided in an assimilable form.

In order to replace the marine chlorella type algae in the best possible way, the incorporation of fish oils, and mainly of cod-liver oil which is especially high in polyunsaturated fatty acids, into some compositions has already been contemplated.

It has already been proposed to enrich bakers' yeast with fish oil, with a view to increasing the dietetic value of the rotifer which feeds on it. The term "rotifer", as used herein, shall mean any of a class of minute, usually microscopic, but many-celled aquatic invertebrate animals having the anterior end modified into a retractile disk bearing circles of strong cilia that often give the appearance of rapidly revolving wheels. In the food chain, the rotifers feed on the yeasts while the fry feed on the rotifers. However, in this application, it is clearly indicated that the yeast must absolutely remain live because otherwise, oil assimilation will not occur and such would lead to a reduction in the nutritive value of the yeast. Additionally, these methods state that the yeast should not be dried because drying would lead to disadvantageous alterations thereof.

On the basis of these demonstrations, it is obvious that the possibilities of application of such a product are largely limited, because most often the yeasts must be freshly prepared and must remain in solution in order to preserve all its properties. In addition, it is known that such products undergo oxidation and even after only eight days of storage, the appearance of mold was observed. Accordingly, these yeast compositions are not suitable for long term storage. It would therefore be advantageous if a dried yeast which would have the same nutritional properties as the marine chlorella type algae, but which could be stored without the oil being oxidized or the appearance of mold being observed were available.

The present invention provides a process which makes it possible to prepare new yeasts containing high polyunsaturated fatty acid oil, which yeasts can be stored without difficulty.

SUMMARY OF THE INVENTION

The present invention also relates to a process for the preparation of new yeasts containing high polyunsaturated fatty acid oil which can be dried and preserved for very long periods of time without any difficulty.

The process of the present invention for preparing new yeasts as food compounds for fry is characterized in that it comprises the steps of:
taking an adequate quantity of a yeast such as *Saccharomyces cerevisiae;*
crumbling the yeast;
adding an adequate quantity of deionized water to the yeast;
adding an adequate quantity of fish oil to this mixture;
homogenizing the mixture by stirring to make a stable emulsion thereof;
transferring the emulsion thus formed to an apparatus for drying it;
collecting the dried yeast loaded with fish oil.

The yeast which is dried and collected at the bottom of the atomizer is then packaged in the absence of air, most often under nitrogen or $CO_2$.

DETAILED DESCRIPTION OF THE PREFERRED EMBODIMENTS

According to the process of the invention, a yeast, such as the *Saccharomyces cerevisiae* type, more commonly called bakers' yeast, is used. Other types of yeast may be utilized since the process of the present invention is independent of metabolism. For instance, *Saccharomyces uvarum* type yeasts can be used. The yeast is usually in the form of compressed blocks, the dry yeast content of which is most commonly between 20 and 35% by weight.

This yeast is introduced into a container and the yeast is crumbled so as to reduce the size of the pieces of yeast to permit better incorporation of the other ingredients.

An adequate quantity of water is then added to this crumbled yeast so as to make a paste which can be easily transported.

Although it is preferable to use deionized water, tap water can however be used which results in an increase in the salt content of the final dry product. This is not very helpful because it decreases the active product content and especially because there is a risk of redissolution of the salts in the food for fry.

The quantity of water to be employed is such that the total dry matter content is between 5 and 20% by weight. In general, a weight of water which is practically equal to the weight of yeast used is added.

To determine the adequate quantity of water to be added, the viscosity should be such that the paste can be easily pumped and directed to a drying device; further, from an economic point of view, the quantity of water should not be too large either because the final product is dry. Thus, the amount of water added depends on the equipment used.

Fish oil, or a mixture of several oils containing at least one fish oil, is then added. The fish oil used in the process of the invention is most commonly codliver oil, the polyunsaturated fatty acid composition of which is advantageous for feeding fry, because it is close to that given by the marine chlorella type algae, however, cuttlefish oil can also be used either alone or in mixture with cod-liver oil. The above oils are utilized because of the desirable fatty acids therein. Other sources of these fatty acids can be utilized. Of the fatty acids in fish oils, $C_{20}$ 2fatty acids having five (5) double bonds and $C_{22}$ fatty acids having six (6) double bonds are of particular interest.

Oils other than cod-liver oil may also be used, provided that their polyunsaturated fatty acid content is advantageous. Fatty substances as such or vitamins or other fat-soluble substances can also be added. In this respect, paprika oil may be mentioned in particular.

Generally, the quantity of oil added is such that the quantity of fat in the yeast and water mixture does not exceed about 20% by weight of the dry matter. When larger quantities of fat are used, a release of oil after drying of the product is observed, which is disadvantageous because then the released is no longer available for feeding fry mollusks or shellfish.

The mixture made up of the yeast, water and oil is then homogenized by vigorous stirring to form a stable emulsion, without emulsifier.

The emulsion may obviously contain preservatives such as anti-oxidants.

This emulsion is pumped into a spray drying device. Generally, the temperature at the inlet of the atomizer is between 170° and 205° C., whereas at the outlet, the temperature is at least 65° C., but it may also reach 95° C. The choice of temperature conditions during drying also depends on the flow rate sought in the drier. Thus, if the temperature is low, the flow rate decreases, in contrast, if the temperature is too high, a partial destruction of the polyunsaturated fatty acids occurs.

According to the process of the invention, it is preferable to operate at an outlet temperature of between 75° and 85° C.

The oil-impregnated particles of yeast are dried and then collected from the bottom of the atomizer. These particles may be stored, for subsequent use, in the absence of air, generally in an inert atmosphere. No disadvantage such as oxidation or appearance of molds is observed.

The following examples are given in order to better illustrate the process of the invention, but without in any way limiting the scope thereof.

EXAMPLE 1

2,000 kg of bakers' yeast which were crumbled into fine particles were introduced into a vessel. This yeast contained 27% by weight of dry matter at the start.

Into this yeast 2000 kg of deionized water, 92 kg of cod-liver oil of composition given in Table I, and 2.85 kg of paprika oil were then mixed.

This mixture was stirred to form a stable emulsion. The 4094.85 kg of emulsion were then pumped to the atomizer inlet at a flow rate of 500 kg per hour. The temperature at the atomizer inlet was 180° C. The temperature at the outlet was 80° C. 635 kg of dry and impregnated yeast were collected, and it was stored under vacuum for six months.

After this period, the product was analyzed, and a polyunsaturated fatty acid composition similar to that of cod-liver oil was ascertained. Furthermore, there was no trace of bacterial infection or of oxidation of these unsaturated fatty acids.

TABLE I

| Composition of Cod-Liver Oil | |
| --- | --- |
| C14/0 | 2.98 |
| C16/0 | 9.22 |
| C16/1 | 9.01 |
| C18/0 | 2.09 |
| C18/1 | 17.50 |
| C18/2 | 4.87 |
| C18/3 + conj | 1.20 |
| C20/0 | 1.89 |
| C20/1 | 13.00 |
| C20/5 | 9.17 |
| C22/1 | 9.45 |

TABLE I-continued

| Composition of Cod-Liver Oil | |
| --- | --- |
| C22/6 | 10.46 |

The numbers after "/" indicate the number of double bonds.

EXAMPLE 2

1575 kg of bakers' yeast which were crumbled into fine particles were introduced into a vessel. This yeast contained 27% by weight of dry matter at the start.

Into this yeast 1575 kg of water, 73 kg of cod-liver oil of composition given in Table II, and 7.5 g of BHT (Butylated Hydroxy Toluene) as anti-oxidant were then mixed.

This mixture was stirred to form a stable emulsion. The 3223 kg of emulsion were then pumped to the atomizer inlet at a flow rate of 500 kg/hour. The temperature at the atomizer inlet was 200° C.

The temperature at the outlet was 85° C. 498 kg of dry and impregnated yeast were collected and stored under vacuum for six months.

After this period, the product was analyzed, and a polyunsaturated fatty acid composition similar to that of cod-liver oil was ascertained. Furthermore, there was no trace of bacterial infection or of oxidation of these unsaturated fatty acids.

TABLE II

| Composition of Cod-Liver Oil | |
| --- | --- |
| C14/0 | 3.24 |
| C16/0 | 10.78 |
| C16/1 | 8.92 |
| C18/0 | 2.49 |
| C18/1 | 23.90 |
| C18/2 | 1.97 |
| C20/0 | 2.29 |
| C20/1 | 11.34 |
| C20/5 | 9.01 |
| C22/1 | 5.62 |
| C22/6 | 10.43 |

By way of comparison, a bakers' yeast was used and grown for 24 hours in the absence of oil and for 24 hours in the presence of cod-liver oil.

The yeast prepared in this way was examined.

After two weeks of storage at 4° C., appearance of molds as well as oxidation of oil were observed.

EXAMPLE 3

800 kg of deionized water were first introduced into a vessel, then 800 kg of bakers' yeast, crumbled into fine particles, were added to the water. Said yeast contained 30% by weight of dry matter at the start.

To this mixture, the following ingredients were added:
- 41.4 kg of cod-liver oil, the composition of which is given in Table III;
- 1.28 kg of paprika oleoresin;
- 171 g of alpha-tocopherol acetate ) as
- 43 g ascorbyl palmitate ) antioxidant This mixture was stirred under inert atmosphere of $N_2$ by means of a mixer, to form a stable emulsion. The 1643 kg of emulsion were pumped to the atomizer inlet at a flow rate of 350 kg/hr. The temperature at the atomizer inlet was 165° C. while the temperature at the outlet was 80° C.

248 kg of dry and impregnated yeast were collected, packaged under inert atmosphere (80% $N_2$–20% $CO_2$) and stored for 6 months.

After this period, the product was analyzed, and a polyunsaturated fatty acid composition similar to that of cod-liver oil was ascertained. Further, there were no traces of microbial infection or of oxidation of these unsaturated fatty acids.

TABLE III

Cod-Liver Oil Composition
(the number after / indicates the number of double bonds)

| | |
|---|---|
| C14/0 | 7.67 |
| C16/0 | 14.75 |
| C16/1 | 10.74 |
| C17/0 | 2.95 |
| C18/0 + C18/1 | 18.65 |
| C18/C | 5.01 |
| C18/2 + conj | 2.31 |
| C20/0 | 5.76 |
| C20/1 | 8.85 |
| C20/5 | 10.90 |
| C22/1 | 3.29 |
| C22/6 | 4.17 |

What we claim is:

1. A method of feeding any of fry, shellfish, and mollusks comprising directly feeding to any of said fry, shell fish, and mollusks a dried yeast feed containing active yeast and fish oil, the amount of fish oil not exceeding 20% by weight of dry matter of the dried yeast, said dried yeast formed by homogenizing a mixture of active yeast, water, and fish oil to form a stable emulsion and then drying the resulting emulsion to remove water therefrom and thereby obtaining said dried yeast feed containing said active yeast and said fish oil in a quantity effective to enhance the nutritive value of said dried yeast feed to the fry, shell fish, and mollusks.

2. The method of claim 1 wherein the active yeast is a *Saccharomyces* genus yeast.

3. The method of claim 2 wherein the active yeast is a compressed yeast having a dry matter content of from about 20% to about 35% by weight.

4. The method of claim 1 wherein the fish oil is selected from the group consisting of cod-liver oil and cuttlefish-liver oil.

5. The method of claim 1 wherein the emulsion is dried in an atomizer having an inlet temperature of from about 170° C. to about 205° C. and an outlet temperature of from about 65° C. to about 95° C.

6. The method of claim 1 wherein the mixture is homogenized by vigorous stirring.

7. The method of claim 1 wherein the mixture is homogenized in the absence of an emulsifier.

* * * * *